United States Patent
Du

(10) Patent No.: US 9,329,672 B2
(45) Date of Patent: May 3, 2016

(54) HIGH-DEFINITION MULTIMEDIA INTERFACE (HDMI) RECEIVER APPARATUSES, HDMI SYSTEMS USING THE SAME, AND CONTROL METHODS THEREFOR

(71) Applicant: MediaTek Singapore Pte. Ltd., Singapore (SG)

(72) Inventor: Liyan Du, Shenzhen (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 2 days.

(21) Appl. No.: 13/705,959

(22) Filed: Dec. 5, 2012

(65) Prior Publication Data

US 2013/0219087 A1    Aug. 22, 2013

(30) Foreign Application Priority Data

Feb. 20, 2012    (CN) .......................... 2012 1 0040443

(51) Int. Cl.
*G06F 3/00*    (2006.01)
*G09G 5/00*    (2006.01)
*G06F 13/38*    (2006.01)
*G06F 13/40*    (2006.01)

(52) U.S. Cl.
CPC *G06F 3/00* (2013.01); *G09G 5/006* (2013.01); *G06F 13/385* (2013.01); *G06F 13/4068* (2013.01); *G09G 2370/047* (2013.01); *G09G 2370/12* (2013.01); *G09G 2370/22* (2013.01)

(58) Field of Classification Search
None
See application file for complete search history.

(56) References Cited

U.S. PATENT DOCUMENTS

| | | | |
|---|---|---|---|
| 2006/0280055 A1* | 12/2006 | Miller et al. | 369/44.11 |
| 2009/0177818 A1* | 7/2009 | Shim et al. | 710/100 |
| 2010/0128178 A1 | 5/2010 | Yun et al. | |
| 2010/0251326 A1* | 9/2010 | Kamon et al. | 725/133 |
| 2011/0283129 A1* | 11/2011 | Guillerm | 713/324 |
| 2011/0291817 A1* | 12/2011 | Maegaki et al. | 340/12.22 |
| 2012/0036284 A1* | 2/2012 | Tao et al. | 710/16 |
| 2012/0044985 A1* | 2/2012 | Tao et al. | 375/240.01 |
| 2013/0057774 A1* | 3/2013 | Yoshida et al. | 348/725 |
| 2014/0042830 A1* | 2/2014 | Lv et al. | 307/326 |

FOREIGN PATENT DOCUMENTS

| | | |
|---|---|---|
| CN | 101127205 A | 2/2008 |
| CN | 201042053 Y | 3/2008 |
| CN | 101465985 A | 6/2009 |

* cited by examiner

*Primary Examiner* — Henry Tsai
*Assistant Examiner* — Aurangzeb Hassan
(74) *Attorney, Agent, or Firm* — McClure, Qualey & Rodack, LLP

(57) ABSTRACT

A high-definition multimedia interface (HDMI) receiver apparatus is provided. The HDMI receiver apparatus includes a pin, a control module, and an extended display identification data (EDID) module. The pin is used to receive an HDMI cable connection voltage in a first operation state and output a hot plug detection signal in a second operation state. The control module is connected with the pin. When the pin receives the HDMI cable connection voltage in the first operation state, the control module switches the pin to the second operation state from the first operation state and outputs the hot plug detection signal to an HDMI transmitter apparatus through the pin, such that the HDMI transmitter apparatus reads EDID information according to the hot plug detection signal. The EDID module is used to store the EDID information.

10 Claims, 5 Drawing Sheets

HIGH-DEFINITION MULTIMEDIA INTERFACE (HDMI) RECEIVER APPARATUSES, HDMI SYSTEMS USING THE SAME, AND CONTROL METHODS THEREFOR

CROSS REFERENCE TO RELATED APPLICATIONS

This Application claims priority of China Patent Application No. 201210040443.4, filed on Feb. 20, 2012, the entirety of which is incorporated by reference herein.

BACKGROUND OF THE INVENTION

1. Field of the Invention

The invention relates to a high-definition multimedia interface (HDMI) technique, and more particularly to an HDMI receiver apparatus, a method for controlling a hot plug detection signal, and an HDMI system.

2. Description of the Related Art

A high-definition multimedia interface (HDMI) is a digital video/audio interface technique which has extensive applications. For HDMI circuits, the conventional design adopts an external electrically erasable programmable read-only memory (EEPROM) for storing extended display identification data (EDID) and uses two general-purpose I/O ports (GPIOs) for respectively performing HDMI cable detection and hot plug detection, thereby controlling the HDMI system. Specifically, when a transmitter (a TX terminal, also called a source terminal) of an HDMI system is connected to a receiver (an RX terminal, also called a sink terminal), the receiver sends a hot plug detection signal to the transmitter. Then the transmitter activates a display data channel (DDC) to read EDID information from the receiver and performs a high-bandwidth digital content protection (HDCP) handshake to achieve mutual authentication. When the mutual authentication is successful, video and audio operations are performed normally; otherwise, the connection fails.

In recent years, with a need for reduction in peripheral integrated circuits (ICs) and simplification of circuit design, the external EEPROM has been replaced with EDID embedded in a system on a chip (SOC). When the embedded EDID is adopted, hot plug detection is usually achieved in the following manner. FIG. 1 shows a schematic view showing a conventional detection circuit for an HDMI receiver. As shown in FIG. 1, when there is embedded EDID, the HDMI receiver uses two general-purpose I/O pins (pins GPIO1 and GPIO2 shown in FIG. 1) to accomplish HDMI control, wherein the pin GPIO1 is used to detect whether an HDMI cable is connected to the HDMI receiver, and the pin GPIO2 is used to control a hot plug detection output level. Specifically, when an HDMI cable is connected to the HDMI receiver, the HDMI receiver would detect a high-level signal on the pin GPIO1. Then the HDMI receiver outputs a low-level hot plug detection signal to an HDMI transmitter through the pin GPIO2, wherein the low-level hot plug detection signal has a length of at least 100 ms. Subsequently, the HDMI receiver changes the low-level hot plug detection signal at the pin GPIO2 to a high-level hot plug detection signal. When the HDMI transmitter detects that the level of the hot plug detection signal has been changed, the HDMI transmitter starts reading the EDID and transmits an HDMI signal. The described high-level hot plug detection signal may be at a level ranging from 2.4V to 5.3V.

When the above manner is adopted to achieve the control of the hot plug detection signal in the receiver with the embedded EDID, two I/O pins are required, which is disadvantageous to high-density integration of HDMI systems.

BRIEF SUMMARY OF THE INVENTION

An exemplary embodiment of an HDMI receiver apparatus is provided. The HDMI receiver apparatus comprises a pin, a control module, and an extended display identification data (EDID) module. The pin is used to receive an HDMI cable connection voltage in a first operation state and output a hot plug detection signal in a second operation state. The control module is connected with the pin. When the pin receives the HDMI cable connection voltage in the first operation state, the control module switches the pin to the second operation state from the first operation state and outputs the hot plug detection signal to an HDMI transmitter apparatus through the pin, such that the HDMI transmitter apparatus reads EDID information according to the hot plug detection signal. The EDID module is used to store the EDID information.

An exemplary embodiment of a method for controlling a hot plug detection signal is provided. The method is performed by an HDMI receiver apparatus. The method comprises a step of detecting whether an HDMI cable connection voltage exists by a pin, being in a first operation state, of the HDMI receiver apparatus. The method further comprises a step of switching the pin to a second operation state from the first operation state and outputting a hot plug detection signal to an HDMI transmitter apparatus through the pin by a control module of the HDMI receiver apparatus, whereby the HDMI transmitter apparatus reads EDID information according to the hot plug detection signal.

An exemplary embodiment of an HDMI system comprises an HDMI receiver apparatus of the present invention and an HDMI transmitter apparatus communicating with the HDMI receiver apparatus through an HDMI cable.

In the HDMI receiver apparatus, one single pin is used to accomplish both the detection of the HDMI cable connection voltage and the control of the hot plug detection signal, so that the number of pins required by the IC of the HDMI receiver apparatus is reduced and the density of integration of the HDMI receiver apparatus is enhanced.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
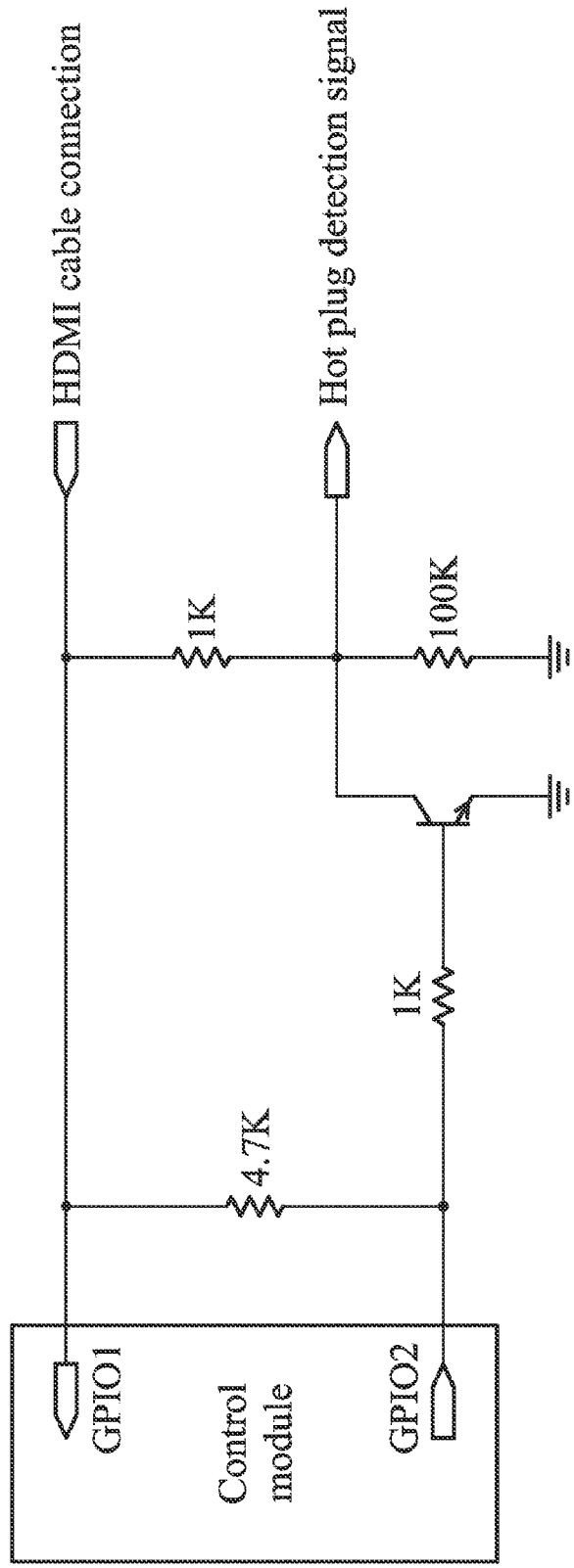
FIG. 1 shows a schematic view showing a conventional detection circuit of a high-definition multimedia interface (HDMI) receiver.
Figure 2:
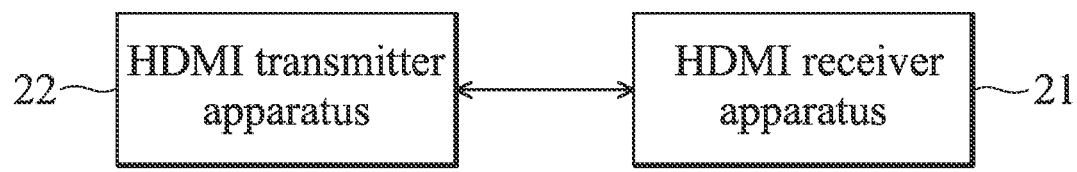
FIG. 2 shows an HDMI system using an HDMI receiver apparatus of the present invention.

FIG. 2 shows a high-definition multimedia interface (HDMI) system using an HDMI receiver apparatus of the present invention. As shown in FIG. 2, the HDMI system includes an HDMI receiver apparatus 21 and an HDMI transmitter apparatus 22. The HDMI receiver apparatus 21 is a video data/audio data displaying apparatus with an HDMI interface, such as a television. The HDMI transmitter apparatus 22 is a video data/audio data providing apparatus with an HDMI interface, such as a digital camera, a camcorder, etc.

Figure 3:
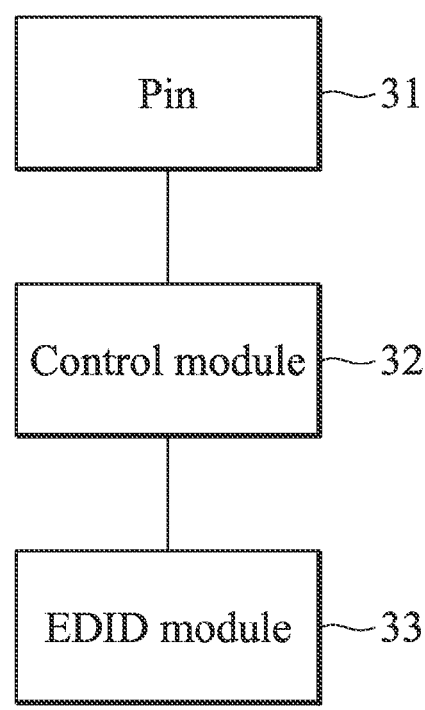
FIG. 3 shows a block diagram of an exemplary embodiment of an HDMO receiver apparatus.
Figure 4:
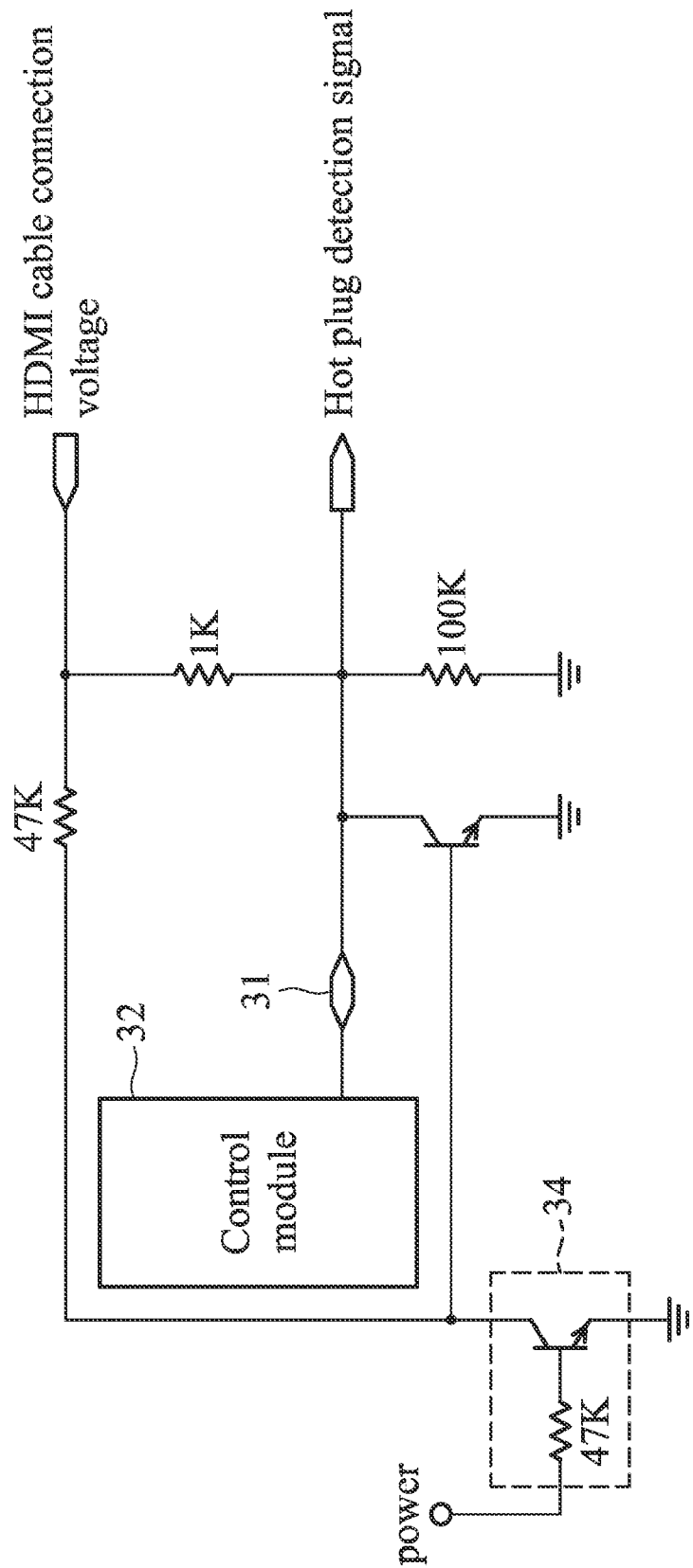
FIG. 4 shows a circuit structure of the HDMI receiver apparatus shown in FIG. 3.

FIG. 3 shows a block diagram of an exemplary embodiment of an HDMI receiver apparatus. FIG. 4 shows a circuit structure of the HDMI receiver apparatus shown in FIG. 3. Since an extended display identification data (EDID) module 33 is embedded in a system on a chip (SOC) of the HDMI receiver apparatus, FIG. 4 does not show the EDID module 33.

The HDMI receiver apparatus includes a pin 31, a control module 32, and the EDID module 33. The pin 31 has two operation states in this embodiment. In a first operation state, the pin 31 is used to detect whether an HDMI cable connection voltage (in the embodiment, 5V is given as an example) exists; and in a second operation state, the pin 31 is used to output a hot plug detection (HDP) signal. In some embodiments, the first operation state is a general-purpose input (GPI) state, while the second operation state is a general-purpose output (GPO) state.

The control module 32 is connected with the pin 31. When the pin 31 detects the existence of the HDMI cable connection voltage in the first operation state, the control module 32 switches the pin 31 from the first operation state to the second operation state and outputs the hot plug detection signal to the HDMI transmitter apparatus through the pin 31, such that the HDMI transmitter apparatus reads EDID information according to the hot plug detection signal.

The EDID module 33 is used to store the EDID information.

The circuit analysis will be described in the following.

The control module 32 may be implemented by an IC chip having a plurality of GPIO pins. The pin 31 is connected with one pin of the control module 32. The state of the pin of the control module 32 may be switched between general-purpose input (GPI state) and general-purpose output (GPO state) according to the IC chip configuration. Since the pin of the control module 32 is connected with the pin 31, the state of the pin 31 is the same as the state of the pin of the control module 32.

During initialization state, the control module 32 controls the pin 31 to be in the first operation state (that is the pin 31 works as a GPI pin) to detect whether the HDMI cable connection voltage (5V) exists. When the HDMI transmitter apparatus is desired to send video/audio data to the HDMI receiver apparatus, the HDMI transmitter apparatus has to connect to the HDMI receiver apparatus using the HDMI cable which has a voltage of 5V.

When the pin 31 receives the HDMI cable voltage (5V), the detected HDMI cable voltage (5V) is input to the control module 32 through the pin of the control module 32. Then, the control module 32 controls the pin 31 to be in the second operation state (that is the GPO state) to output the hot plug detection signal to the HDMI transmitter apparatus.

The HDMI transmitter apparatus detects whether the HDMI receiver apparatus is ready to receive video/audio data according to the hot plug detection signal from the HDMI receiver apparatus. If the HDMI receiver apparatus is ready, the HDMI transmitter apparatus reads the EDID information through the EDID module 33 embedded in the HDMI receiver apparatus and performs an authentication process of high-bandwidth digital content protection (HDCP). When the authentication is successful, the HDMI transmitter apparatus sends video/audio data to the HDMI receiver apparatus.

According to the HDMI receiver apparatus of the above embodiment, the pin 31 in the first operation state can detect whether the HDMI cable connection voltage exists, and in the second operation state can output the hot plug detection signal. Moreover, when pin 31 receives the HDMI cable connection voltage which is provided from the HDMI transmitter apparatus to the HDMI receiver apparatus, the control module 32 can switch the pin 31 to the second operation state and output the hot plug detection voltage to the HDMI transmitter apparatus. Accordingly, one single pin can accomplish both the detection of the HDMI cable connection voltage and the control of the hot plug detection signal, accordingly the number of pins required by the IC of the HDMI receiver apparatus is reduced and the density of integration of the HDMI receiver apparatus is promoted.

Further, compared with the current manner which detects whether an HDMI system is connected to an HDMI receiver apparatus through detection of an HDMI clock signal of an HDMI transmitter apparatus, the HDMI receiver apparatus of the embodiment, which detects whether an HDMI system is connected to the HDMI receiver apparatus by detecting the existence of an HDMI cable voltage, in this way, the HDMI receiver apparatus shortens the detection time and enhances the detection sensitivity. Because there is no need to continuously enabling a clock signal with 3.3V which is biased by a direct current, the power consumption can also be decreased. In the current manner where the HDMI clock signal is detected to determine the HDMI cable voltage existence, the detection of the HDMI clock signal is required to perform ceaselessly for 50 successive cycles. Since each HDMI clock is approximately 20 ms, the current manner requires at least one second to accomplish the detection of the HDMI system. However, the embodiment of the present invention takes only 100 ms to accomplish the detection of the HDMI system.

To be noted, the values of the elements shown in FIG. 4 are given as an example without limitations. One skilled in the art can understand that the elements with other values can be applied in the circuit.

Figure 5:
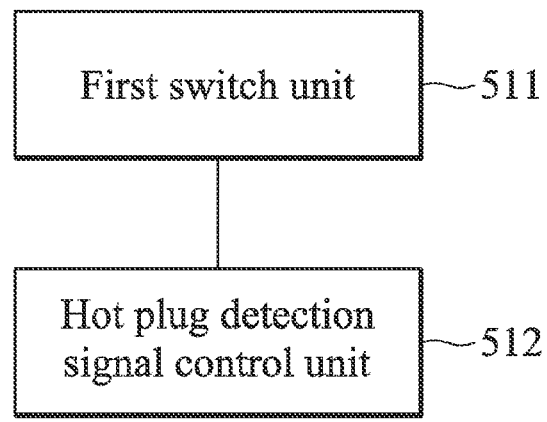
FIG. 5 shows one exemplary embodiment of the control module of the HDMI receiver apparatus of FIG. 3.

Further, FIG. 5 shows one exemplary embodiment of the control module of the HDMI receiver apparatus of FIG. 3. As shown in FIG. 5, in the HDMI receiver apparatus of the above embodiment, the control module includes a first switch unit 511. When the pin 31 receives the HDMI cable connection voltage in the first operation state, the first switch unit 511 switches the pin 31 to the second operation state from the first operation state. In some embodiments, the first operation state is a general-purpose input (GPI) state, while the second operation state is a general-purpose output (GPO) state.

The first switch unit 511 further includes a hot plug detection signal control unit 512. When the pin 31 is switched to the second operation state, the hot plug detection signal control unit 512 outputs a low-level signal for a first predetermined duration followed by a high-level signal for a second predetermined duration.

Specifically, according to the HDMI standard requirements, when the pin 31 receives the HDMI cable connection voltage (5V), the hot plug detection signal control unit 512 outputs the hot plug detection signal which is at a low level for a duration equal to or longer than 100 ms, and then the hot plug detection signal control unit 512 switches the hot plug detection signal to a high level. When the HDMI transmitter apparatus detects that the hot plug detection signal has been switched to the high level from the low level, the HDMI transmitter acknowledges that the HDMI receiver apparatus is ready to receive the video/audio data, the HDMI transmitter apparatus then reads the EDID information from the EDID module embedded in the HDMI receiver apparatus. For example, the duration of the high level of the hot plug detection signal is 300 ms.

Figure 6:
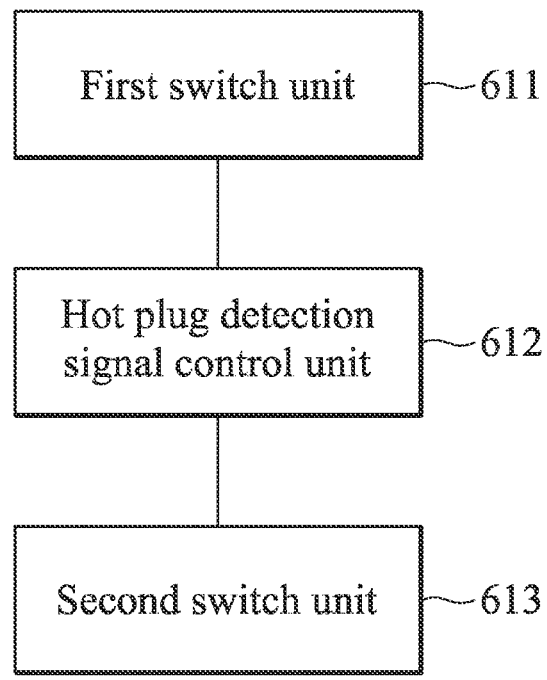
FIG. 6 shows another exemplary embodiment of the control module of the HDMI receiver apparatus of FIG. 3.

FIG. 6 shows another exemplary embodiment of the control module of the HDMI receiver apparatus of FIG. 3. As shown in FIG. 6, in the HDMI receiver apparatus of the above embodiment, the control module includes a first switch unit 61. When the pin 31 receives the HDMI cable connection voltage in the first operation state, the first switch unit 611 switches the pin 31 from the first operation state to the second operation state.

The control module further includes a hot plug detection signal control unit 612. When the pin 31 is switched to the second operation state, the hot plug detection signal control unit 612 outputs a low-level signal for a first predetermined duration and a high-level signal for a second predetermined duration to the HDMI transmitter apparatus.

The control module further includes a second switch unit 613. After the pin 31 outputs the high-level signal for the second predetermined duration, the second switch unit 613 switches the pin 31 back to the first operation state from the second operation state.

Further, as shown in FIG. 4, the HDMI receiver apparatus of the above embodiment further includes a level control module 34. When the HDMI receiver apparatus is powered off, the level control module 34 controls the EDID module to be in an unreadable state.

Specifically, the level control module 34 comprises, for example, a triode. The base of the triode is electrically connected to a power source through a resistor (such as a resistor whose resistance is 47K), the collector thereof is electrically connected to an HDMI cable connection port through a resistor (such as a resistor whose resistance is 47K), and the emitter thereof is electrically connected to a ground. Thus, when the HDMI receiver apparatus is powered off (the supplied power is 0), the triode of the level control module 34 is cut off. The hot plug detection signal output by the hot plug detection signal output terminal is at a low level, which ensures that the EDID module embedded in a system on a chip is in an unreadable state when the HDMI receiver apparatus is powered off. To be noted, the reference values of the circuit elements are given as an example for description without limitations. One skilled in the art can understand that elements with other values can be applied in the circuit. The embodiments of FIGS. 5 and 6 can be implemented in various hardware circuits, for example, a general-purpose controller, an application-specific integrated circuit (ASIC), or a system on a chip (SoC).

Figure 7:
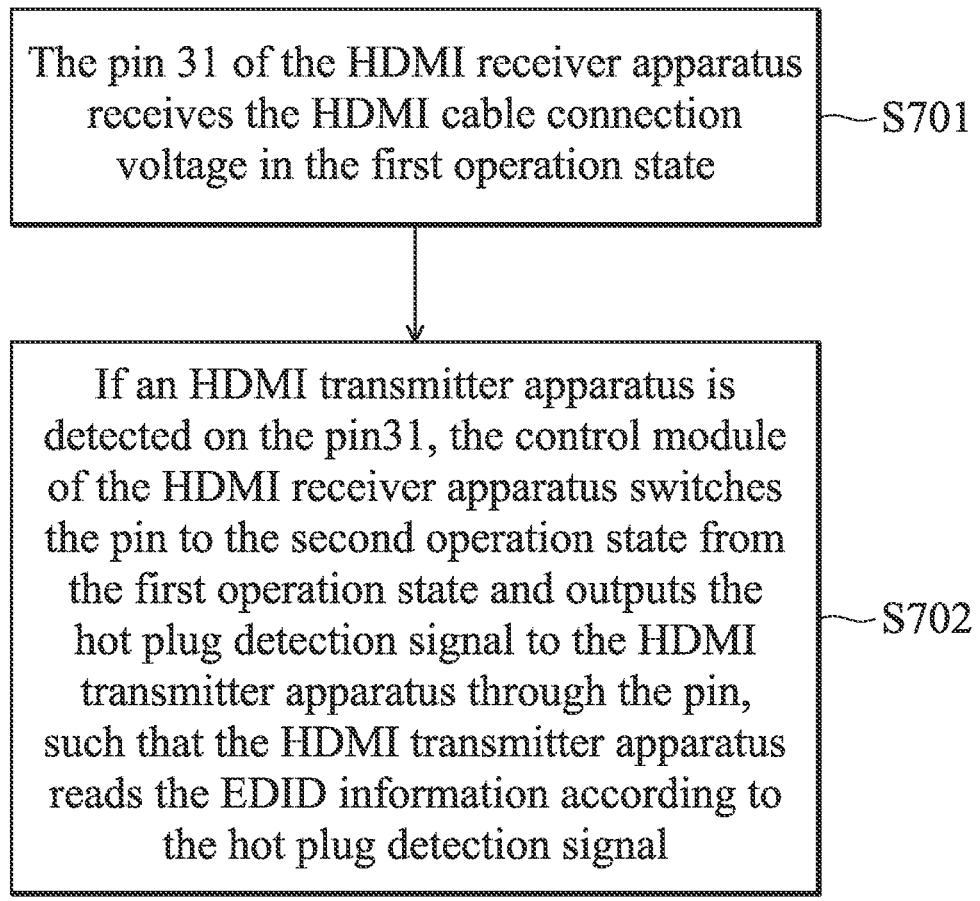
FIG. 7 is a flow chart of an exemplary embodiment of a control method for outputting a hot plug detection signal.

FIG. 7 is a flow chart of an exemplary embodiment of a method for controlling a hot plug detection signal. As shown in FIG. 7, the method for controlling the hot plug detection signal comprises:

Step S701: the pin 31 of the HDMI receiver apparatus receives the HDMI cable connection voltage in the first operation state;

Step S702: If an HDMI transmitter apparatus is detected on the pin 31, the control module of the HDMI receiver apparatus switches the pin 31 to the second operation state from the first operation state and outputs the hot plug detection signal to the HDMI transmitter apparatus through the pin 31, such that the HDMI transmitter apparatus reads the EDID information according to the hot plug detection signal.

The method for controlling the hot plug detection signal in the above embodiment is performed by the HDMI receiver apparatus of the present invention. The description of the specific procedure is omitted here.

According to the method for controlling the hot plug detection signal in the above embodiment, one single pin is used to accomplish both the detection of the HDMI cable connection voltage and the control of the hot plug detection signal, which reduces the number of pins required by the IC of the HDMI receiver apparatus and enhances the density of integration of the HDMI receiver apparatus. Further, compared with the current manner which detects the HDMI clock signal of an HDMI transmitter apparatus, the HDMI cable connection voltage is detected instead, the HDMI receiver apparatus of the embodiment shortens the detection time and enhances the detection sensitivity. Because there is also no need to maintain enabling a clock signal with 3.3V which is biased by a direct current, the power consumption can be decreased.

Further, in the method for controlling the hot plug detection signal in the above embodiment, outputting the hot plug detection signal to the HDMI transmitter apparatus through the pin 31 includes outputting the hot plug detection signal with the low level for the first predetermined duration; and outputting the hot plug detection signal with the high level for the second predetermined duration to the HDMI transmitter apparatus through the pin 31.

Moreover, in the method for controlling the hot plug detection signal in the above embodiment, after outputting the hot plug detection signal with the low level for the first predetermined duration, and outputting the hot plug detection signal with the high level for the second predetermined duration to the HDMI transmitter apparatus through the pin 31, the method further comprises switching the pin 31 back to the first operation state from the second operation state.

In the method for controlling the hot plug detection signal in the above embodiment, the first predetermined duration in one example is equal to or longer than 100 ms, while the second predetermined duration in one example is equal to 300 ms.

An exemplary embodiment of an HDMI system is also provided. The HDMI system includes the HDMI receiver apparatus of the above embodiment and the HDMI transmitter apparatus communicating with the HDMI receiver apparatus through an HDMI cable.

According to the HDMI system in the above embodiment, one single pin is used to accomplish both the detection of the HDMI cable connection voltage and the control of the hot plug detection signal, thus the number of pins required by the IC of the HDMI receiver apparatus is reduced and the density of integration of the HDMI receiver apparatus is promoted. Further, compared with the current manner which detects the HDMI clock signal of an HDMI transmitter apparatus, HDMI cable connection voltage is detected instead, the HDMI receiver apparatus of the embodiment shortens the detection time and enhances the detection sensitivity. Because there is also no need to maintain enabling a clock signal with 3.3V which is biased by a direct current, the power consumption can be decreased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A high-definition multimedia interface (HDMI) receiver apparatus comprising:
   one single pin for receiving an HDMI cable connection voltage via an HDMI cable connection port in a first operation state and outputting a hot plug detection signal in a second operation state;
   a control module connected to the pin, wherein when the pin receives the HDMI cable connection voltage in the first operation state, the control module switches the in to the second operation state from the first operation state and outputs the hot plug detection signal to an HDMI transmitter apparatus through the pin, whereby the HDMI transmitter apparatus reads extended display identification data (EDID) information according to the hot plug detection signal;
   a triode having a base electrically connected to the HDMI cable connection port, a collector electrically connected to the in and the hot plug detection signal, and an emitter electrically connected to a ground; and
   an EDID module for storing the EDID information,
   wherein the control module comprises:
   a first switch unit for switching the pin to the second operation state from the first operation state when the pin detects that the HDMI cable connection voltage exists in the first operation state; and
   a hot plug detection signal control unit for outputting the hot plug detection signal with a low level for a first predetermined duration, and outputting the hot plug detection signal with a high level for a second predetermined duration to the HDMI transmitter apparatus through the pin when the pin is switched to the second operation state.

2. The HDMI receiver apparatus as claimed in claim 1, wherein the control module further comprises:
   a second switch unit for switching the pin to the first operation state from the second operation state after the hot plug detection signal with the high level is output through the pin for the second predetermined duration.

3. The HDMI receiver apparatus as claimed in claim 1, wherein the first predetermined duration is equal to or longer than 100 ms.

4. The HDMI receiver apparatus as claimed in claim 1, wherein the second predetermined duration is equal to 300 ms.

5. A high-definition multimedia interface (HDMI) receiver apparatus comprising:
   one single in for receiving an HDMI cable connection voltage via an HDMI cable connection port in a first operation state and outputting a hot plug detection signal in a second operation state;
   a control module connected to the pin, wherein when the in receives the HDMI cable connection voltage in the first operation state, the control module switches the pin to the second operation state from the first operation state and outputs the hot plug detection signal to an HDMI transmitter apparatus through the pin, whereby the HDMI transmitter apparatus reads extended display identification data (EDID) information according to the hot plug detection signal;
   a triode having a base electrically connected to the HDMI cable connection port, a collector electrically connected to the pin and the hot plug detection signal, and an emitter electrically connected to a ground;
   an EDID module for storing the EDID information; and
   a level control module for controlling the EDID module to be in an unreadable state when the HDMI receiver apparatus is powered off,
   wherein the level control module comprises:
   a triode having a base electrically connected to a power source, a collector electrically connected to the HDMI cable connection port, and an emitter electrically connected to ground.

6. A high-definition multimedia interface (HDMI) system comprises:
   an HDMI receiver apparatus comprising:
   one single in for receiving an HDMI cable connection voltage via an HDMI cable connection port in a first operation state and outputting a hot plug detection signal in a second operation state;
   a control module connected to the pin, wherein when the in receives the HDMI cable connection voltage in the first operation state, the control module switches the pin to the second operation state from the first operation state and outputs the hot plug detection signal to an HDMI transmitter apparatus through the pin, whereby the HDMI transmitter apparatus reads extended display identification data (EDID) information according to the hot plug detection signal;
   a triode having a base electrically connected to the HDMI cable connection port, a collector electrically connected to the pin and the hot plug detection signal, and an emitter electrically connected to a ground;
   an EDID module for storing the EDID information; and
   the HDMI transmitter apparatus for communicating with the HDMI receiver apparatus through an HDMI cable,
   wherein the control module comprises:
   a first switch unit for switching the pin to the second operation state from the first operation state when the pin detects that the HDMI cable connection voltage exists in the first operation state; and
   a hot plug detection signal control unit for outputting the hot plug detection signal with a low level for a first predetermined duration, and outputting the hot plug detection signal with a high level for a second predetermined duration to the HDMI transmitter apparatus through the pin when the pin is switched to the second operation state.

7. The HDMI system as claimed in claim 6, wherein the control module further comprises:
   a second switch unit for switching the pin to the first operation state from the second operation state after the hot plug detection signal is output through the pin for the second predetermined duration with the high level.

8. The HDMI system as claimed in claim 6, wherein the first predetermined duration is equal to or longer than 100 ms.

9. The HDMI system as claimed in claim 6, wherein the second predetermined duration is equal to 300 ms.

10. A high-definition multimedia interface (HDMI) system comprises:
    an HDMI receiver apparatus comprising:
    one single pin for receiving an HDMI cable connection voltage via an HDMI cable connection port in a first operation state and outputting a hot plug detection signal in a second operation state;
    a control module connected to the pin, wherein when the pin receives the HDMI cable connection voltage in the first operation state, the control module switches the in to the second operation state from the first operation state and outputs the hot plug detection signal to an HDMI transmitter apparatus through the pin, whereby the HDMI transmitter apparatus reads extended display identification data (EDID) information according to the hot plug detection signal;
a triode having a base electrically connected to the HDMI cable connection port, a collector electrically connected to the in and the hot plug detection signal, and an emitter electrically connected to a ground;
an EDID module for storing the EDID information,
the HDMI transmitter apparatus for communicating with the HDMI receiver apparatus through an HDMI cable; and
a level control module for controlling the EDID module to be in an unreadable state when the HDMI receiver apparatus is powered off,
wherein the level control module comprises:
a triode having a base electrically connected to a power source, a collector electrically connected to the HDMI cable connection port, and an emitter electrically connected to ground.

* * * * *